United States Patent
Hansen

(10) Patent No.: US 9,664,177 B2
(45) Date of Patent: May 30, 2017

(54) METHOD AND CLEANING PLATE FOR CLEANING A BRAKE OF A WIND TURBINE

(71) Applicant: Nordex Energy GmbH, Hamburg (DE)

(72) Inventor: Ocke-Philipp Hansen, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 634 days.

(21) Appl. No.: 14/057,678

(22) Filed: Oct. 18, 2013

(65) Prior Publication Data

US 2014/0112788 A1 Apr. 24, 2014

(30) Foreign Application Priority Data

Oct. 19, 2012 (EP) ..................................... 12007242

(51) Int. Cl.
| | |
|---|---|
| *F16D 65/00* | (2006.01) |
| *F03D 80/55* | (2016.01) |
| *F03D 11/00* | (2006.01) |

(52) U.S. Cl.
CPC .......... *F03D 11/0016* (2013.01); *F03D 80/55* (2016.05); *F16D 65/0037* (2013.01); *F16D 65/0043* (2013.01)

(58) Field of Classification Search
CPC ...... F03D 11/0016; F03D 80/00; F03D 80/50; F03D 80/55; F03D 3/062; F03D 7/0248; F16D 6/0037; F16D 65/00; F16D 65/0043; F16D 65/005; F05D 2260/902; B08B 1/006; B08B 1/007; B08B 1/008
See application file for complete search history.

(56) References Cited

U.S. PATENT DOCUMENTS

| | | | | |
|---|---|---|---|---|
| 2008/0264741 | A1* | 10/2008 | Fujita | ...................... F16D 65/12 188/18 A |
| 2009/0071770 | A1 | 3/2009 | Bagge et al. | |
| 2010/0209246 | A1* | 8/2010 | Migliori | ................ F03D 7/0204 416/1 |

FOREIGN PATENT DOCUMENTS

| | | |
|---|---|---|
| DE | 198 49 790 A1 | 5/2000 |
| DE | 103 36 984 A1 | 3/2005 |

* cited by examiner

*Primary Examiner* — Craig Kim
*Assistant Examiner* — Danielle M Christensen
(74) *Attorney, Agent, or Firm* — Walter Ottesen, P.A.

(57) ABSTRACT

The invention is directed to a method for cleaning a brake of a wind turbine. The brake has a brake disc and at least one brake unit, wherein the brake disc and the brake unit can be moved relative to one another via a drive. The method includes fastening a cleaning plate to the brake disc; releasing at least one brake unit; moving the brake disc and the brake unit relative to one another so that the cleaning plate is moved past a brake pad of the brake unit while making applied contact engagement to the brake pad; and, dismounting the cleaning plate from the brake disc.

11 Claims, 3 Drawing Sheets

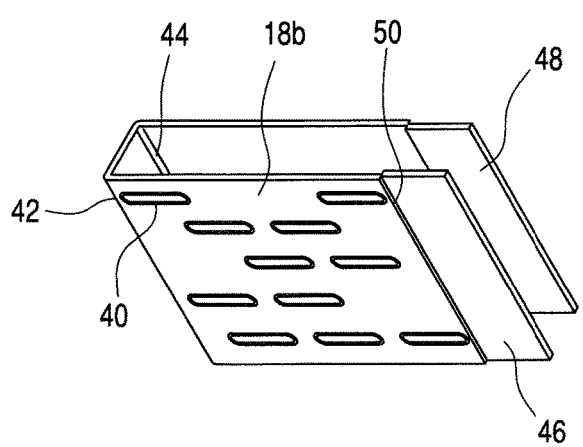
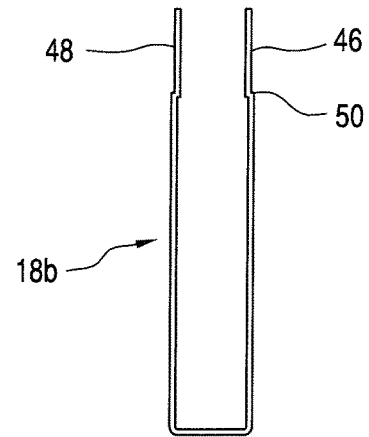
FIG. 4               FIG. 5
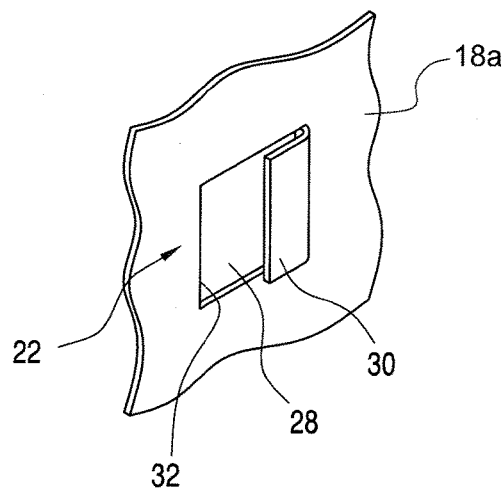
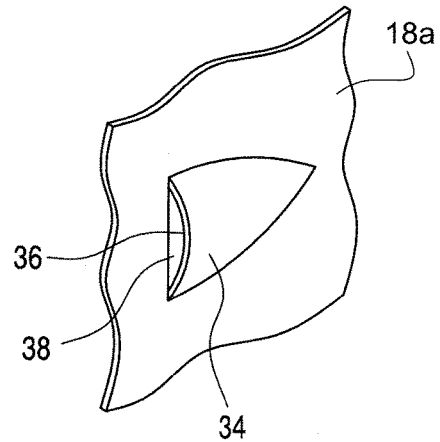
FIG. 6               FIG. 7

METHOD AND CLEANING PLATE FOR CLEANING A BRAKE OF A WIND TURBINE

CROSS REFERENCE TO RELATED APPLICATION

This application claims priority of European patent application no. 12007242.6, filed Oct. 19, 2012, the entire content of which is incorporated herein by reference.

FIELD OF THE INVENTION

The invention relates to a method for cleaning a brake of a wind turbine and to a cleaning plate for a brake of a wind turbine.

BACKGROUND OF THE INVENTION

In the case of wind turbines, in particular in the case of the azimuth drive thereof, the problem of squeaking brakes arises. From experience, the squeaking of the brake occurs after only a relatively short operating duration of the brake and is caused by dirt on the brake pads, this dirt being formed in particular from metallic abrasion debris which is worked into the brake pads again as a result of the high brake pressure. This gives rise to a so-called glazing on the brake pads which takes the form of plaque or a continuous surface made predominantly of iron oxide residues. Squeaking noises arise particularly commonly in azimuth brakes because, as is known, the wind tracking of the nacelle is commonly performed with slipping brakes in order to dampen the rotational movement.

It is known that, in the case of squeaking azimuth brakes, the brake pads must be cleaned. Because of the installation position of the brake calipers with the brake pads, it is necessary for this purpose for the brake calipers to be dismounted and for access to be provided to the brake pads in this manner.

In the field of automotive engineering, for disc brakes in motor vehicles, it has become known from DE 103 36 984 A1 to provide, for disc brakes, a retention device with multiple scraper elements for the purpose of collecting the brake dust that is generated. The intention of this is to prevent a deterioration of the visual appearance of the wheel rim and the associated depreciation in value of the motor vehicle.

DE 198 49 790 C2 discloses a brake pad for a friction brake of a rail vehicle. This friction brake has a scraper which is mounted in a groove and which has a protruding lamella in order to provide a scraper for brake abrasion debris which acts in both directions of rotation.

U.S. patent application publication 2009/0071770 A1 discloses a dirt scraper for a disc brake. The dirt scraper, by means of a heat-sensitive device, bears against the brake disc at low temperatures and is lifted from the brake disc at relatively high temperatures.

SUMMARY OF THE INVENTION

It is the object of the invention to provide a method and a cleaning device for cleaning a brake of a wind turbine. The method and device permit cleaning of the brake pads without great effort and using simple means.

The method of the invention is for cleaning a brake of a wind turbine having a brake disc, at least one brake unit having a brake pad, a drive, the brake disc and the brake unit being configured to be movable relative to one another via the drive. The method includes the steps of: fixing a cleaning plate onto the brake disc; releasing the at least one brake unit; moving the brake disc and the brake unit relative to one another to cause the cleaning plate to move past the brake pad of the brake unit while making an applied contact engagement therewith; and, removing the cleaning plate from the brake disc.

The method according to the invention serves for the cleaning of a brake of a wind turbine, in particular in order to eliminate squeaking or other disturbing noises of the brake. The brake of the wind turbine has a brake disc and at least one brake unit, wherein the brake disc and brake unit can be rotated relative to one another via a drive. The brake unit is also referred to in technical parlance as a brake caliper. The method according to the invention provides that a cleaning plate is fastened to the brake disc. Before or after the fastening of the cleaning plate, an at least partial release or opening of the brake unit is performed such that the brake pad of the brake unit is not in contact with the brake disc. Via the drive, a rotational movement of the brake disc and of the brake unit relative to one another is performed such that the cleaning plate is moved past, while being in applied contact engagement with, a brake pad of the brake unit. Depending on the configuration of the brake, the cleaning plate may be moved through the brake unit via a rotational movement of the brake disc and of the brake unit relative to one another. In a subsequent step, the cleaning plate is dismounted from the brake disc. The method according to the invention is in particular characterized in that the cleaning plate is fastened only temporarily to the brake disc and can be removed from the brake disc again after cleaning the brake pad. Dismounting of the brake unit and removal of the brake pads are not necessary for this purpose. The down time of the wind turbine for cleaning the brake is very significantly shortened by the method according to the invention.

It is preferably provided in the method according to the invention that the cleaning plate is moved past the brake pad of the brake unit multiple times before the dismounting of the cleaning plate. Here, the cleaning plate may be moved past from different directions or repeatedly from the same direction.

In a preferred embodiment, it is ensured that a predetermined contact pressure is attained during the relative movement of the brake pad and of the cleaning plate relative to one another. The contact pressure can be set in a variety of ways. For example, a defined contact pressure may be attained by virtue of the brake unit being only partially opened. Another possibility, that can also be used in addition, for ensuring a predetermined contact pressure during the relative movement of the brake pad and cleaning plate past one another is selecting a suitable thickness of the cleaning plate.

In a particularly preferred embodiment, the cleaning plate is equipped with at least one of recesses, cutouts and projections. The recesses, cutouts and/or projections scrape along the brake pad during the relative movement, such that a layer that has formed on the brake pad in particular as a result of abrasion debris is scraped off. Here, the scraping movement takes place via the edges provided on the recesses or cutouts in the cleaning plate and/or on the projections formed on the cleaning plate. During the scraping process, it is preferably the case that no material of the brake pad itself is removed; only a layer that has formed on the brake pad is removed. The process may be regarded as a scraping-off or stripping-off of the surface of the brake pad.

The cleaning device of the invention is for cleaning a brake of a wind turbine, the brake having a brake disc and a brake unit having a brake pad. The cleaning device includes: a cleaning plate; a connecting arrangement configured to connect the cleaning plate to the brake disc; and, the cleaning plate having a thickness configured such that the cleaning plate attached to the brake disc is movable through the brake unit while making applied contact engagement with the brake pad of the brake unit.

The cleaning device according to the invention has means for fastening the cleaning plate to the brake disc. Furthermore, the thickness of the cleaning plate is selected such that the cleaning plate fastened to the brake disc can be moved with the brake disc through the brake unit, wherein the cleaning plate makes applied contact engagement with the brake pad of the brake unit. The cleaning plate according to the invention can be used in accordance with the method according to the invention for cleaning the brake pad, wherein the movement of the cleaning plate along the brake pad has the effect that a layer that has formed on the brake pad is scraped off or stripped off, as a result of which squeaking between the brake pad and brake disc is subsequently prevented.

In a preferred embodiment, the cleaning plate has at least one of a recess, cutout and projection which scrapes along the brake pad during a relative movement between the cleaning plate and the brake pad. Here, the scraping action is generated substantially by edges of the recess or cutout and/or by the projections provided on the cleaning plate, wherein it is not absolutely necessary here to provide defined cutters or cutting edges; even simple edges in the recesses, cutouts or on the projections, such as are formed in the cleaning plate as a result of a punching or cutting process, are sufficient.

In one preferred embodiment, a multiplicity of recesses or cutouts is provided, of which at least one has a projection which scrapes along the brake pad during the relative movement. Here, the projection need not necessarily have a sharp edge, but rather can protrude with a small height out of the cleaning plate and can, for example, be made of an upwardly folded portion.

In a further preferred embodiment, the cleaning plate has a bevel along an edge which enters the brake unit first during a relative movement between the brake unit and the cleaning plate. The bevel, for example in the form of a chamfer, makes it possible for the cleaning plate to enter the brake unit without making contact with the latter and for the brake pad to slide onto the cleaning plate. In general, the brake pads in the brake unit are mounted in a resilient manner when the brake is fully or partially opened, such that the brake pad can slide onto the cleaning plate and rests on the latter under pressure.

In a preferred embodiment, the cleaning plate has a U-shaped form, the legs of which are arranged parallel to one another. The legs of the U-shaped cleaning plate bear areally against the brake disc in the mounted state, thus increasing the thickness of the latter substantially in each case by the thickness of the cleaning plate.

The cleaning plate according to the invention is preferably used in a wind turbine. Here, the cleaning plate has bores which serve for the fastening to the brake disc or to a fastening section formed on the brake disc.

In a preferred embodiment, the cleaning plate makes applied contact engagement with the brake disc of the wind turbine and is guided with said brake disc through the brake unit.

The brake unit is preferably an azimuth brake via which a rotational movement between a nacelle and a tower is braked.

BRIEF DESCRIPTION OF THE DRAWINGS

The invention will now be described with reference to the drawings wherein:

FIG. 4 shows a perspective view of the U-shaped cleaning plate;

FIG. 5 shows a view of the U-shaped cleaning plate from the side;

FIG. 6 shows a detail view of a cutout in the cleaning plate;

FIG. 7 shows a detail view of an alternative cutout on the cleaning plate; and, FIG. 8 shows a detailed view of the bevel of a cleaning plate according to another embodiment of the invention.

DESCRIPTION OF THE PREFERRED
EMBODIMENTS OF THE INVENTION

Figure 1:
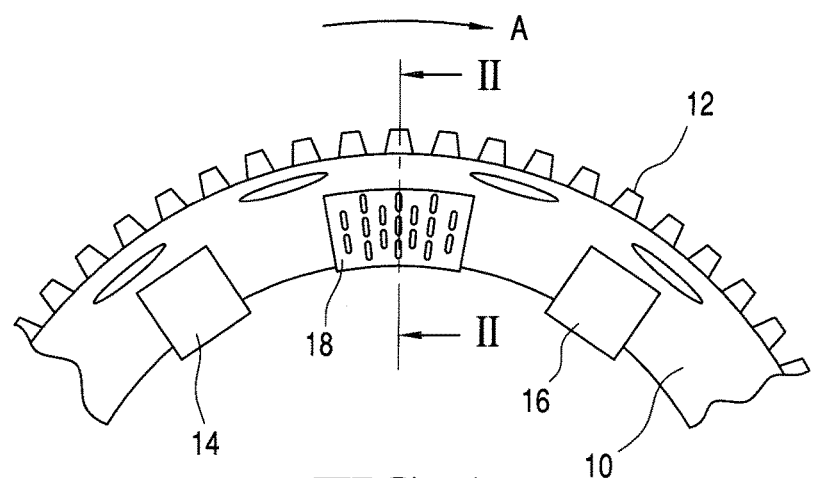
FIG. 1 shows a detail of a circular brake disc having a cleaning plate mounted thereon.

FIG. 1 shows a detail of a brake disc 10 such as is provided for example for the azimuth drive of a wind turbine. The brake disc 10 is in the form of a ring with a substantially uniform thickness, the ring having a crown gear 12 on its outer side. At the inside, brake units 14 and 16 are provided, also referred to in technical parlance as brake calipers. The brake units 14 and 16 are hydraulically actuated and each have a pair of brake pads which are pressed against both sides of the brake disc 10. For the cleaning of the brake pads, a cleaning plate 18 is mounted onto the brake disc 10, the cleaning plate 18 being shown between the brake units 14 and 16. In general, the brake disc 10 is fixedly connected to the nacelle or machine housing (not shown). Via the crown gear 12, an azimuth drive (not shown) can rotate the brake disc 10 and thus the nacelle. Principally, the drive can also act at some other location, such that the crown gear need not perforce be provided on the brake disc. The brake units 14, 16 are fixedly arranged with respect to the tower and can thus brake a rotational movement of the nacelle.

Figure 2:
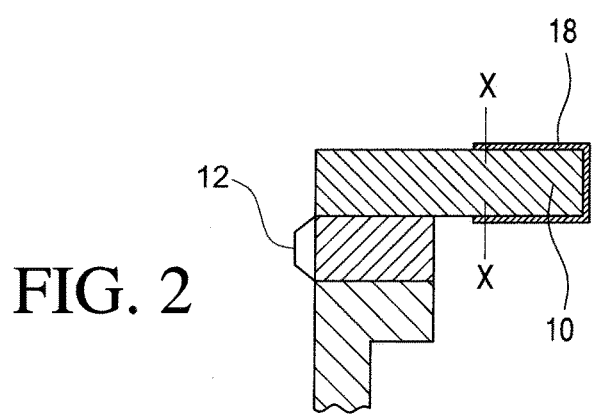
FIG. 2 shows a section along the line II-II of FIG. 1.

As can be seen from the sectional drawing of FIG. 2, the cleaning plate 18 is placed around the inner edge 20 of the brake disc 10 in a U-shape form. The cleaning plate 18 is in this case screwed to the brake disc 10 at the positions denoted by X-X. The fastening means for the cleaning plate 18 are in this case arranged such that they do not come into contact with the brake pads of the brake units 14 and 16. More specifically, the cleaning plate has bores which serve for fastening the same to the brake disc 10 as shown schematically in FIG. 2 by the line X-X.

For the cleaning of the brake pads of the brake unit 16, the nacelle is rotated, as can be seen from FIG. 1, with its brake disc 10 in the direction shown by the arrow A, such that the cleaning plate 18 is moved through the brake unit 16. In the process, the cleaning plate 18 comes into contact with the brake pads (not shown) of the brake unit 16. The layer of abrasion debris, also referred to in technical parlance as glazing, that forms as a result of the continuous operation of the brake unit 16 is removed from the brake pads by the cleaning plate 18. In this case, after or before the mounting of the cleaning plate 18, the brake unit 16 is partially opened so that the cleaning plate 18 can slide onto the brake pads, and thus the brake pads exert a certain contact pressure on the cleaning plate 18. As a result of the cleaning plate 18, the coating, normally present in the form of plaque, is removed from the brake pads, and the brake pads are thus cleaned.

Figure 3:
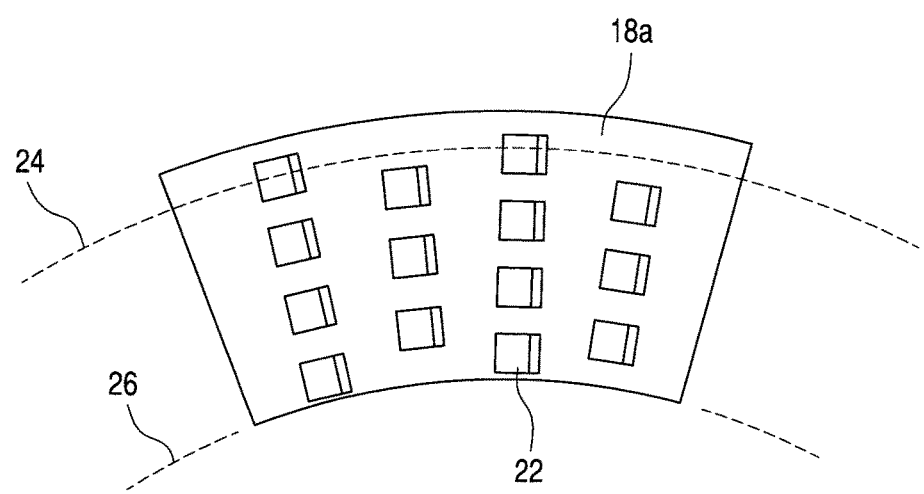
FIG. 3 shows a detail view of the cleaning plate.

FIG. 3 shows, in a schematic view, a cleaning plate 18a on which cutouts 22 are provided. Here, the dashed lines 24, 26 indicate the area swept by the brake pads. During a movement of the cleaning plate 18a, the removal from the brake pads of the layer formed by abrasion debris is assisted by the cutouts 22.

FIG. 6 shows a detail view of the cutout 22, which is formed by a through opening 28 and an upwardly folded section 30. The upwardly folded section 30 forms a projection on the cleaning plate 18a; the projection locally increases the contact pressure between the brake pads and the cleaning plate 18a. The upwardly folded section 30 exerts a scraping action on the brake pad and thus removes from the brake pad a coating that has built up over the course of time.

FIG. 7 shows an alternative embodiment of a cutout on the cleaning plate, in which a bulge 34 is provided on the cleaning plate; the bulge has a curved edge 36 for the removal of a coating on the brake pad. The bulge 34 extends substantially over an opening 38 in the cleaning plate.

FIG. 4 shows, in a perspective view, an alternative embodiment of a cleaning plate 18b which is provided substantially with slot-shaped recesses or cutouts 40. The slot-shaped recesses or cutouts 40 extend in this case approximately in the radial direction of the brake disc. The cleaning plate 18b is made of a continuous metal sheet which is bent in a U-shape along the fold edges 42 and 44. At the region 46 that is not guided through the brake units, this region being provided on the end of the cleaning plate 18b, the cleaning plate has an offset 50. As can be seen in FIG. 5, the cleaning plate 18b is set back along the offset 50, such that the cleaning plate 18b has a smaller width in the regions 46 and 48. The smaller width in the regions 46 and 48 makes it possible for the cleaning plate 18b to better adapt to the shape of the brake disc, in particular if the brake disc has a set-back portion or a step.

The cleaning plate is preferably made of metal and is, for example, nickel-plated or produced from high-grade steel. In the case of typical brake units, a thickness of the cleaning plate of from 0.5 mm to 1.5 mm, preferably from 0.6 mm to 0.8 mm, has proven to be advantageous.

It is understood that the foregoing description is that of the preferred embodiments of the invention and that various changes and modifications may be made thereto without departing from the spirit and scope of the invention as defined in the appended claims.

What is claimed is:

1. A method for cleaning a brake of a wind turbine having a brake disc, at least one brake unit having a brake pad, a drive, the brake disc and the brake unit being configured to be movable relative to one another via the drive, the method comprising the steps of:
    fixing a cleaning plate onto the brake disc;
    releasing said at least one brake unit;
    moving the brake disc and the brake unit relative to one another to cause the cleaning plate to move past the brake pad of the brake unit while making an applied contact engagement therewith; and,
    removing the cleaning plate from the brake disc.

2. The method of claim 1, wherein the cleaning plate is moved past the brake pad a plurality of times before removing the cleaning plate from the brake disc.

3. The method of claim 1, wherein the brake pad of the brake unit and the cleaning plate move past one another with a predetermined contact pressure.

4. The method of claim 1, wherein the cleaning plate has at least one of recesses, cutouts and projections configured to scrape along the brake pad of the brake unit when moving the brake disc and the brake unit relative to one another.

5. A cleaning device for cleaning a brake of a wind turbine, the brake having a brake disc having a surface and a brake unit having a brake pad, the cleaning device comprising:
    a cleaning plate;
    a connecting arrangement configured to connect said cleaning plate to the surface of the brake disc;
    said surface defining an area on the brake disc against which the brake pad of the brake unit is pressed;
    said connecting arrangement including bores arranged on said cleaning plate, and fasteners configured for fastening said cleaning plate through said bores to said brake disc; and,
    said cleaning plate having a thickness configured such that said cleaning plate attached to the brake disc is movable through the brake unit while making applied contact engagement with the brake pad of the brake unit.

6. A cleaning device for cleaning a brake of a wind turbine, the brake having a brake disc and a brake unit having a brake pad, the cleaning device comprising:
    a cleaning plate;
    a connecting arrangement configured to connect said cleaning plate to the brake disc;
    said cleaning plate having a thickness configured such that said cleaning plate attached to the brake disc is movable through the brake unit while making applied contact engagement with the brake pad of the brake unit;
    said cleaning plate defining a plurality of recesses or cutouts; and,
    at least one of said recesses or cutouts having a projection configured to scrape along on the brake pad during a movement of the brake disc and the brake unit relative to one another.

7. A cleaning device for cleaning a brake of a wind turbine, the brake having a brake disc and a brake unit having a brake pad, the cleaning device comprising:
    a cleaning plate;
    a connecting arrangement configured to connect said cleaning plate to the brake disc;
    said cleaning plate having a thickness configured such that said cleaning plate attached to the brake disc is movable through the brake unit while making applied contact engagement with the brake pad of the brake unit;
    said cleaning plate having an edge configured to enter the brake unit first when the brake disc and the brake unit move relative to one another; and,
    said cleaning plate further having a bevel provided along said edge.

8. A cleaning device for cleaning a brake of a wind turbine, the brake having a brake disc and a brake unit having a brake pad, the cleaning device comprising:
    a cleaning plate;
    a connecting arrangement configured to connect said cleaning plate to the brake disc;
    said cleaning plate having a thickness configured such that said cleaning plate attached to the brake disc is movable through the brake unit while making applied contact engagement with the brake pad of the brake unit; and, said cleaning plate being a U-shaped cleaning plate defining legs arranged in parallel to each other.

9. A wind turbine comprising:

a brake disc having a surface;

a brake unit having a brake pad;

said surface defining an area on the brake disc against which said brake pad of said brake unit is pressed;

a cleaning plate having bores configured to connect said cleaning plate to said surface of said brake disc; and, said cleaning plate further having a thickness configured such that said cleaning plate when attached to said brake disc is movable through said brake unit while making applied contact engagement with said brake pad of said brake unit.

10. The wind turbine of claim 9, wherein said cleaning plate is further configured to seat tightly on said brake disc and to be guided through said brake unit with said brake disc.

11. The wind turbine of claim 9 further comprising:

a machine housing; and, said brake unit being an azimuth brake unit configured to brake a rotational movement of said machine housing.

* * * * *

UNITED STATES PATENT AND TRADEMARK OFFICE
CERTIFICATE OF CORRECTION

PATENT NO. : 9,664,177 B2
APPLICATION NO. : 14/057678
DATED : May 30, 2017
INVENTOR(S) : Ocke-Philipp Hansen It is certified that error appears in the above-identified patent and that said Letters Patent is hereby corrected as shown below:

In the Specification

Figure 8:
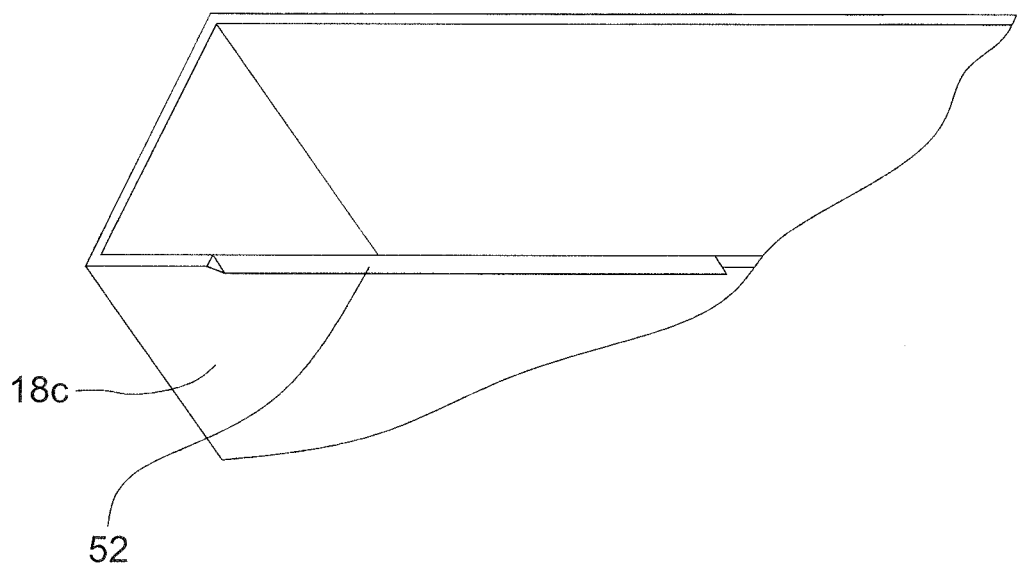

In Column 5:
Line 44: insert paragraph:
-- In a further preferred embodiment shown in FIG. 8, the cleaning plate 18c has a bevel 52 along an edge 54 which enters the brake unit 14 first during a relative movement between the brake unit 14 and the cleaning plate. The bevel 52, for example in the form of a chamfer, makes it possible for the cleaning plate 18c to enter the brake unit without making contact with the latter and for the brake pad to slide onto the cleaning plate. In general, the brake pads in the brake unit 14 are mounted in a resilient manner when the brake is fully or partially opened, such that the brake pad can slide onto the cleaning plate 18c and rests on the latter under pressure. -- after "0.8 mm, has proven to be advantageous.".

Signed and Sealed this
Sixteenth Day of October, 2018

Andrei Iancu
*Director of the United States Patent and Trademark Office*